US008234753B2

(12) United States Patent
Cook (10) Patent No.: US 8,234,753 B2
(45) Date of Patent: Aug. 7, 2012

(54) COOK HINGE

(75) Inventor: Jay W. Cook, China Spring, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 853 days.

(21) Appl. No.: 12/290,025

(22) Filed: Oct. 24, 2008

(65) Prior Publication Data

US 2010/0101054 A1 Apr. 29, 2010

(51) Int. Cl.
*E05D 7/10* (2006.01)

(52) U.S. Cl. ......... 16/262; 16/379; 16/382; 244/129.5; 49/398

(58) Field of Classification Search .......... 16/256, 16/262, 382, 386, 387, 390, 378, 379; 244/129.5; 49/398

See application file for complete search history.

(56) References Cited

U.S. PATENT DOCUMENTS

| | | | | |
|---|---|---|---|---|
| 1,640,525 | A | * | 8/1927 | Belliveau ............... 16/390 |
| 2,926,382 | A | * | 3/1960 | Knese et al. ............ 16/261 |
| 3,183,548 | A | * | 5/1965 | Speakman ............. 16/366 |
| 3,835,585 | A | * | 9/1974 | Anderson et al. ....... 49/398 |
| 4,177,540 | A | * | 12/1979 | Gorton .................. 16/335 |
| 4,603,452 | A | * | 8/1986 | Paciorek ............... 16/262 |
| 4,928,350 | A | * | 5/1990 | Morgan ................. 16/297 |
| 5,082,405 | A | | 1/1992 | Witten |
| 5,943,739 | A | * | 8/1999 | Vandergriff ............ 16/366 |
| 7,203,997 | B2 | * | 4/2007 | Morgan ................. 16/358 |
| 2004/0231106 | A1 | * | 11/2004 | Shire .................... 16/390 |

OTHER PUBLICATIONS

The Hardware Aisle, "Bronze Hardware: Reproductions Done Right", Printed from Internet Oct. 9, 2008, 5 pgs.
Hafele, "Hinges and Stays", Jul. 2006, 1 pg.
Parasol Aviation, "The 45 Series/45 Type", Printed from Internet Sep. 30, 2008, 3 pgs.
Parasol Aviation, "45 Type", Printed from Internet Sep. 30, 2008, 1 pg.
Parasol Aviation, Printed from Internet Oct. 1, 2008, 1 pg.
Parasol Aviation, 94-PAR-AV-45, Printed from Internet Sep. 30, 2008, 1 pg.
Parasol Aviation, HB-451, Printed from Internet Sep. 30, 2008, 1 pg.
Parasol Aviation, P-201, Printed from Internet Sep. 30, 2008, 1 pg.

* cited by examiner

*Primary Examiner* — William L. Miller
(74) *Attorney, Agent, or Firm* — O'Keefe, Egan, Peterman & Enders LLP (57) ABSTRACT

A hinge assembly may be provided to hingeably couple two substrates together to allow one of the substrates to pivot about the center plane of the other substrate. The hinge assembly may include two separable hinge components that are manufactured from lightweight materials and that are configured to provide up to about 180 degrees of swing for a door or other hingeably-coupled substrate. Polymer bushings may be employed to preclude the need for lubrication of the hinge assembly, and a spring loaded tab may be provided on a hinge pin of the hinge assembly to provide for ease of installation, removal or replacement of a hingeably coupled substrate. Flow channels with injection ports may be defined within each of the separable hinge components of the hinge assembly, and configured to evenly distribute injected bonding material around the components of the hinge assembly while they are positioned within respective substrate cavities.

34 Claims, 9 Drawing Sheets

SECTION B-B

COOK HINGE

This invention was made with United States Government support under Contract No. N00019-05-C-0030. The Government has certain rights in this invention.

FIELD OF THE INVENTION

This invention relates generally to hinge devices, and more particularly to apparatus and methods for hingeably coupling two substrates together.

BACKGROUND OF THE INVENTION

Figure 1:
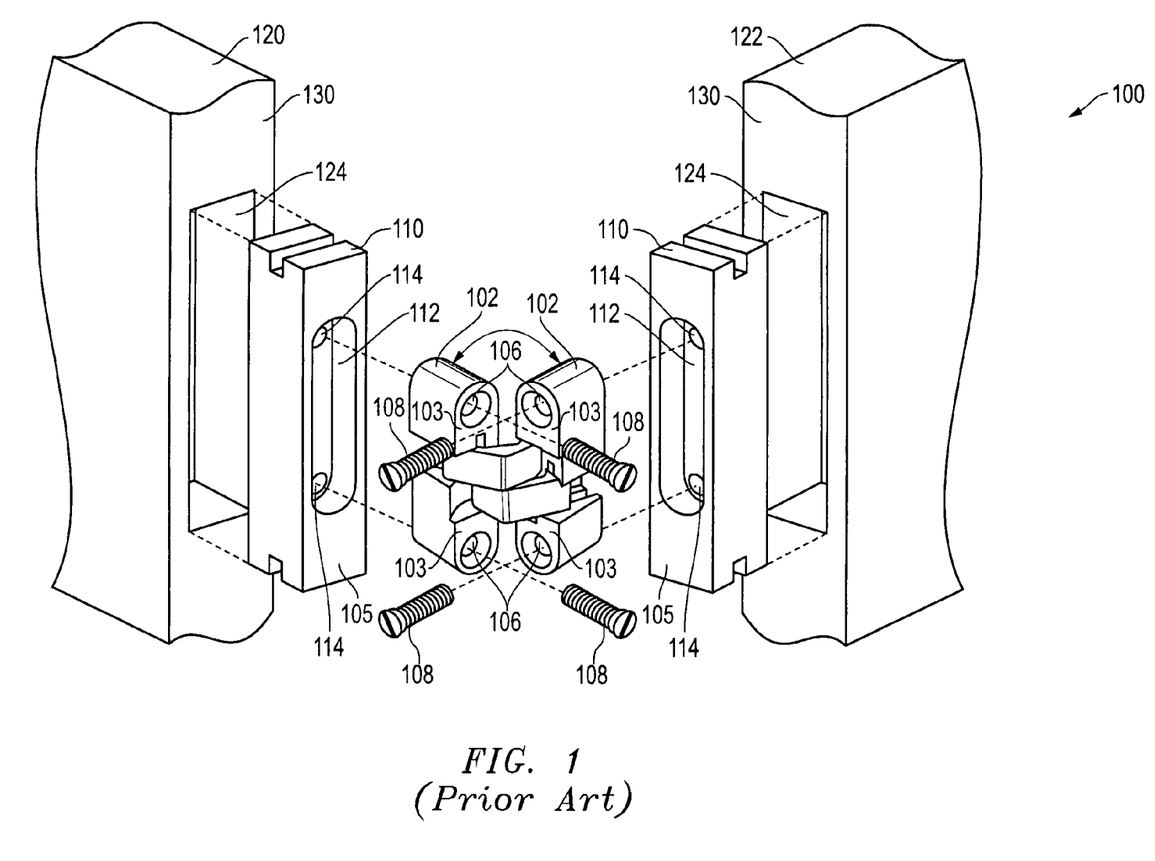
FIG. 1 is a perspective view of a concealed hinge device of the prior art.

FIG. 1 illustrates a concealed hinge device 100 of the prior art that includes a first hinge component 102 coupled to a second hinge component 102, and that is shown positioned for installation to hingeably couple a first planar substrate 120 to a second planar substrate 122 (e.g., respective aircraft cabinet wall and cabinet door panel components that may be constructed of honeycomb composite material). Also shown in FIG. 1 are block inserts 110 that each have a cavity 112 defined therein that is dimensioned to receive one of hinge components 102 in a manner so that face surface 103 of each of hinge components 102 is positioned flush coplanar arrangement with the face surface 105 of the corresponding block insert 110. A cavity 124 is in turn provided in each of face surfaces 130 of respective first and second substrates 120 and 122. Each cavity 124 is internally dimensioned to receive one of block inserts 110 so that face surface 105 of each of block inserts 110 is positioned flush coplanar arrangement with the face surface 105 of the corresponding block insert 110. Each block insert cavity 112 is further provided with two threaded openings 114 that are each configured to threadably receive a flathead screw fastener 108 when it is inserted through a corresponding opening 106 defined in one of hinge components 102 as shown in FIG. 1 in order to securably retain the given hinge component 102 within its corresponding block insert cavity 112. Each block insert cavity 110 is configured to be securably retained within its given substrate cavity 124 by applying epoxy adhesive compound to the block inserts 110 prior to inserting the block inserts 110 into cavities 124, and then allowing the adhesive to cure.

To assemble prior art hinge device 100 to first and second substrates 120 and 122, first and second block inserts 110 may first be inserted and secured within corresponding substrate cavities 124 of first and second substrates 120 and 122 by applying epoxy adhesive compound to blocks 110 and substrates 120 and 122. Next, a first one of hinge components 102 may be inserted and secured by two fasteners 108 within a cavity 112 of a first one of the block inserts 110 that has been previously secured within a first one of the substrates 120 or 122. The remaining second hinge component 102 may then be inserted into the remaining open second block insert cavity 112 by bringing the second substrate into angled adjacent position (as shown in FIG. 1). Two fasteners 108 may then be used to secure the second hinge component 102 within the cavity 112 of the second substrate. Because the face surface 103 of each of hinge components 102 is disposed in flush coplanar relationship with the corresponding adjacent face surfaces 105 and 130, substrates 120 and 122 are now hingeably coupled together in a manner so that hinge components 102 are concealed when first and second substrates 120 and 122 are rotated about hinge device 100 into end-to-end orientation with each other.

SUMMARY OF THE INVENTION

Disclosed herein are hinge assemblies that may be provided to hingeably couple two substrates together to allow one of the substrates to pivot about the center plane of the other substrate. In this regard, a hinge assembly may be advantageously configured in one embodiment as a concealed hinge to provide a concealed hinge installation with the rotational axis (i.e., pivot point) of a first substrate (e.g., such as a door) positioned in the center plane of a second substrate (e.g., such as an affixed wall), and that is further capable of meeting high longitudinal and lateral restraint requirements for which conventional concealed hinges are not capable. In one exemplary embodiment, one or more of the disclosed hinge assemblies may be employed to rotatably or hingeably couple together substrates that are manufactured from composite materials (e.g., Nomex honeycomb panel) while providing sufficient load carrying capability for high longitudinal and lateral restraint requirements (e.g., greater than or equal to about 350 lbs core shear, greater than or equal to about 350 lbs pin bending, and/or greater than or equal to about 100 lbs abuse load). One example of such an implementation is the mounting of composite material cabinet doors (e.g. having either flat or curved door configuration) to an affixed (stationary) wall that is also manufactured from composite materials, and in a manner that provides a rotational axis for the door that is located in the center plane of the affixed wall.

Advantageously, the disclosed hinge assemblies may be employed for any application where it is desired to hingeably couple together two substrates including, but not limited to, coupling a cabinet or galley door to a fixed cabinet or galley wall, coupling a conventional door to a fixed wall, coupling two table sections together (e.g., folding table leaf section to a fixed table section), etc. Furthermore, the disclosed hinge assemblies may be implemented for applications in a variety of environments including, but not limited to, aviation/aerospace applications (e.g., installed in fixed wing commercial or military aircraft, helicopters, spacecraft, etc.), automotive applications (e.g., installed in recreational vehicles, automobiles, trucks, buses, etc.), marine applications (installed in ships, boats, etc.), train applications, mobile home applications, conventional building applications (e.g., office buildings, homes etc.). The disclosed hinge assemblies may be provided as part of an original installation or may be provided as repair or retrofit components, e.g., as part of modification to an original installation.

In one exemplary embodiment, the disclosed hinge assemblies may be manufactured from lightweight (e.g., aluminum) materials and be configured to provide up to about 180 degrees of swing for a door or other hingeably-coupled substrate. Such a hinge assembly may be further provided with polymer bushings to preclude the need for lubrication of the hinge assembly. A spring loaded tab may be provided on the hinge pin of a hinge assembly to provide for ease of installation, removal or replacement of a hingeably coupled substrate. In a further embodiment, flow channels with injection ports may be provided on both the hinge block component (i.e., the hinge assembly component that includes the containing pin) and the hinge style component (i.e., the other hinge assembly component that is rotatably coupled to the hinge pin) of a hinge assembly. Such flow channels may be configured to eliminate voids (trapped air pockets) in bonding material by directing flow of injected bonding material for substantially even distribution around each of the hinge components while they are positioned within a respective substrate cavity, and while increasing adhesion capability when cured.

In one respect, disclosed herein is a hinge assembly, including: a first hinge component having a first internal hinge pin opening defined therein, the first hinge component being configured to be contained within an internal cavity of a first substrate with at least one face surface of the first hinge component being exposed; a second hinge component having a second internal hinge pin opening defined therein, the second hinge component being configured to be contained within an internal cavity of a second substrate with at least one face surface of the second hinge component being exposed; an elongated hinge pin configured to be simultaneously received in at least a portion of the first internal hinge pin opening of the first hinge component and in at least a portion of the second internal hinge pin opening of the second hinge component to hingeably couple together the first hinge component and the second hinge component. The first hinge component may include at least one bonding material injection port defined in the at least one face surface of the first hinge component, the at least one bonding material injection port providing a communication path through at least one flow channel to allow placement by injection of an uncured flowable bonding material between the first hinge pin component and the internal cavity of the first substrate. The second hinge component may include at least one bonding material injection port defined in the at least one face surface of the second hinge component, the at least one bonding material injection port providing a communication path through at least one flow channel to allow placement by injection of an uncured flowable bonding material between the second hinge pin component and the internal cavity of the second substrate.

In another respect, disclosed herein is a method of hingeably coupling two substrates together, the method including: providing a first hinge component having a first internal hinge pin opening defined therein; providing a second hinge component having a second internal hinge pin opening defined therein; providing an elongated hinge pin configured to be simultaneously received in at least a portion of the first internal hinge pin opening of the first hinge component and in at least a portion of the second internal hinge pin opening of the second hinge component to hingeably couple together the first hinge component and the second hinge component; positioning the first hinge component within an internal cavity of a first substrate with at least one face surface of the first hinge component being exposed and injecting an uncured bonding material into at least one bonding material injection port defined in the at least one face surface of the first hinge component while the first hinge component is so positioned within the internal cavity of a first substrate, and displacing the at least one bonding material from the injection port through at least one flow channel in the first hinge component to place the uncured bonding material between the first hinge pin component and the internal cavity of the first substrate; allowing the uncured bonding material to cure in a position between the first hinge pin component and the internal cavity of the first substrate so that the first hinge component is securably retained within the internal cavity of the first substrate by the cured bonding material; positioning the second hinge component within an internal cavity of a second substrate with at least one face surface of the second hinge component being exposed and injecting an uncured bonding material into at least one bonding material injection port defined in the at least one face surface of the second hinge component while the second hinge component is so positioned within the internal cavity of a second substrate, and displacing the at least one bonding material from the injection port through at least one flow channel in the second hinge component to place the uncured bonding material between the second hinge pin component and the internal cavity of the second substrate; allowing the uncured bonding material to cure in a position between the second hinge pin component and the internal cavity of the second substrate so that the second hinge component is securably retained within the internal cavity of the second substrate by the cured bonding material so that the first substrate is hingeably coupled together with the second hinge component.

In another respect, disclosed herein is an assembly of two substrates, including: a first hinge component and a first substrate, the first hinge component having a first internal hinge pin opening defined therein, and the first hinge component being securably retained by cured bonding material within an internal cavity of the first substrate with at least one face surface of the first hinge component being exposed; a second hinge component and a second substrate, the second hinge component having a second internal hinge pin opening defined therein, and the second hinge component being securably retained by cured bonding material within an internal cavity of the second substrate with at least one face surface of the second hinge component being exposed; and an elongated hinge pin simultaneously received in at least a portion of the first internal hinge pin opening of the first hinge component and in at least a portion of the second internal hinge pin opening of the second hinge component to hingeably couple together the first hinge component and the second hinge component. The first hinge component may include at least one bonding material injection port defined in the at least one face surface of the first hinge component, the at least one bonding material injection port providing a communication path through at least one flow channel to allow placement by injection of the bonding material in uncured form between the first hinge pin component and the internal cavity of the first substrate. The second hinge component may include at least one bonding material injection port defined in the at least one face surface of the second hinge component, the at least one bonding material injection port providing a communication path through at least one flow channel to allow placement by injection of the bonding material in uncured form between the second hinge pin component and the internal cavity of the second substrate.

DESCRIPTION OF ILLUSTRATIVE EMBODIMENTS

Figure 2:
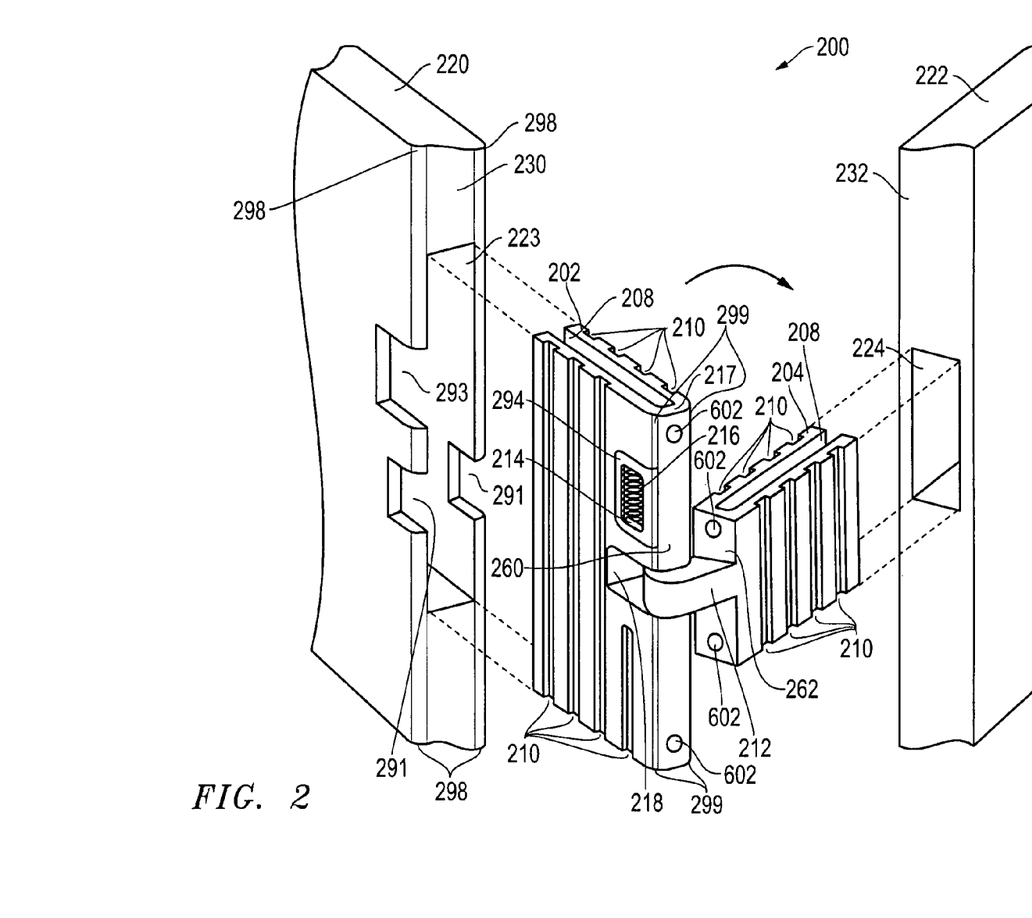
FIG. 2 is a perspective view of a hinge assembly according to one exemplary embodiment of the disclosed apparatus and methods.
Figure 3:
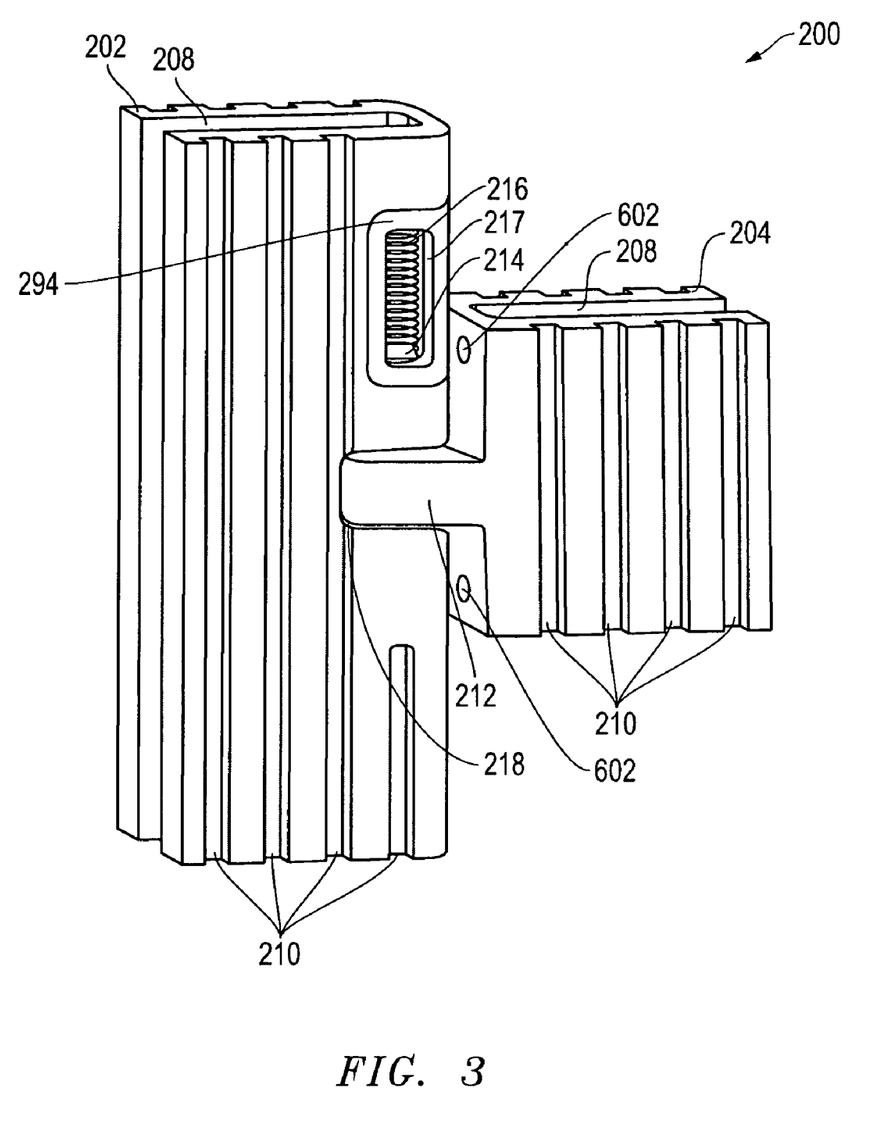
FIG. 3 is a perspective view of a hinge assembly according to one exemplary embodiment of the disclosed apparatus and methods.

FIGS. 2-9 illustrate components of a hinge assembly 200 as it may be configured in one exemplary embodiment to include a first hinge component 202 coupled to a second hinge component 204. In particular, FIG. 2 shows hinge assembly 200 positioned for installation to hingeably couple a first substantially planar substrate 220 to a second substantially planar substrate 222 (e.g., respective cabinet door and cabinet wall components in one embodiment). Each of first and second hinge components 202 and 204 may be constructed of any material of strength suitable for providing load carrying capability for meeting the longitudinal and lateral restraint requirements of a given hinge application (e.g., metal such as steel, aluminum or brass; synthetic material such as polymer plastic, etc.). In one exemplary embodiment, each of hinge components 202 and 204 may be constructed of relatively lightweight material such as aluminum or aluminum alloy that is machined to provide the specific structural features described further herein. In one embodiment, first hinge component 202 may be characterized as a hinge block component (e.g., for installation in a door substrate of a cabinet), and second hinge component 204 may be characterized as a hinge style component (e.g., for installation in a wall substrate of a cabinet).

In the illustration of FIG. 2, first substrate 220 is shown rotated relative to second substrate 222 as shown by the arrow of rotation. Such would be the case, for example, in an exemplary embodiment where a cabinet panel door 220 is rotated in "open" position relative to a cabinet panel wall 222 by about 180 degrees from a fully closed position (i.e., where cabinet panel door 220 is oriented at about 90 degrees to cabinet panel wall 222 when it is closed). In such an exemplary embodiment, the illustrated orientation of FIGS. 3-6 correspond to a cabinet panel door 220 rotated in "open" position relative to a cabinet panel wall 222 by about 90 degrees from fully closed position. As described further herein with relation to FIG. 5, such an about 180 degree opening rotation capability may be made possible in an embodiment where opposing corner edges 550 and 551 are rounded to provide radius for rotational clearance, whereas an about 110 degree opening rotation capability is possible in an embodiment where only one corner edge 550 is so rounded (i.e., in which case the non-rounded corner acts as a mechanical stop).

As shown in FIG. 2, a cavity 223 is provided in the face surface 230 of first substrate 220 that is internally dimensioned to receive first hinge component 202 so that face surface 260 of first hinge component 202 is positioned flush coplanar relationship with face surface 230 of first substrate 220, and a cavity 224 is provided in the face surface 232 of second substrate 222 that is internally dimensioned to receive second hinge component 204 so that face surface 262 of second hinge component 204 is positioned flush coplanar relationship with face surface 232 of second substrate 222. As shown in FIG. 2, face surface 260 of first hinge component 202 may be provided in one exemplary embodiment with two rounded (radiused) edges 299, and first substrate 220 may be provided with two corresponding rounded (radiused) edges 298 that extend from rounded edges 299 of first hinge component 202 to provide clearance for rotation of separate components of hinge assembly 200. As discussed in relation to FIG. 5, only one rounded edge 299 and 298 may be employed in another exemplary embodiment. In any case, although any suitable radius may be employed to provide clearance for rotation of separate components 202 and 204 of hinge assembly 200, rounded edges 299 and 298 may each have a radius of about 0.16 inch in one exemplary embodiment. In the illustrated exemplary embodiment, face surface 262 of second hinge component 204 and second substrate 222 may be left square as shown.

Depending on the given substrate materials, cavities 223 and 224 may be routed or otherwise machined out of each of first and second substrates 220 and 222, or may be integrally formed therein, e.g., as part of a molding process. Examples of substrate materials include, but are not limited to, substrates constructed of wood, metal, plastic, composite materials (e.g., Nomex composite honeycomb panel), etc. As shown in the embodiment of FIG. 2, first hinge component 202 is configured to be received within cavity 223 without requiring fasteners (e.g., screws, bolts, etc.) or a separate insert component therebetween and second hinge component 204 is configured to be received within cavity 224 without requiring fasteners (e.g., screws, bolts, etc.) or a separate insert component therebetween, although it will be understood that separate insert components may be positioned between a hinge component and a substrate cavity if so desired.

As will be further described herein, first and second hinge components 202 and 204 are configured to be securably retained within respective substrate cavities 223 and 224 (without requiring any fasteners or requiring separate insert components to be positioned therebetween) by a flowable structural adhesive, potting or bonding compound, or other suitable bonding material. In this regard, the proper flowable bonding material may be selected to fit the materials of a given application, e.g., the proper structural adhesive for bonding aluminum hinge components to aluminum substrates, the proper structural adhesive for bonding aluminum hinge components to composite material panel, etc. In one exemplary embodiment, aluminum hinge components may be bonded to Nomex composite honeycomb panel (e.g., 0.5" thick or thicker than 0.5" panel material in one embodiment) using flowable epoxy resin such as ATR 500 A/B available from AAR Composites of Wood Dale, Ill., etc.

Figure 6:
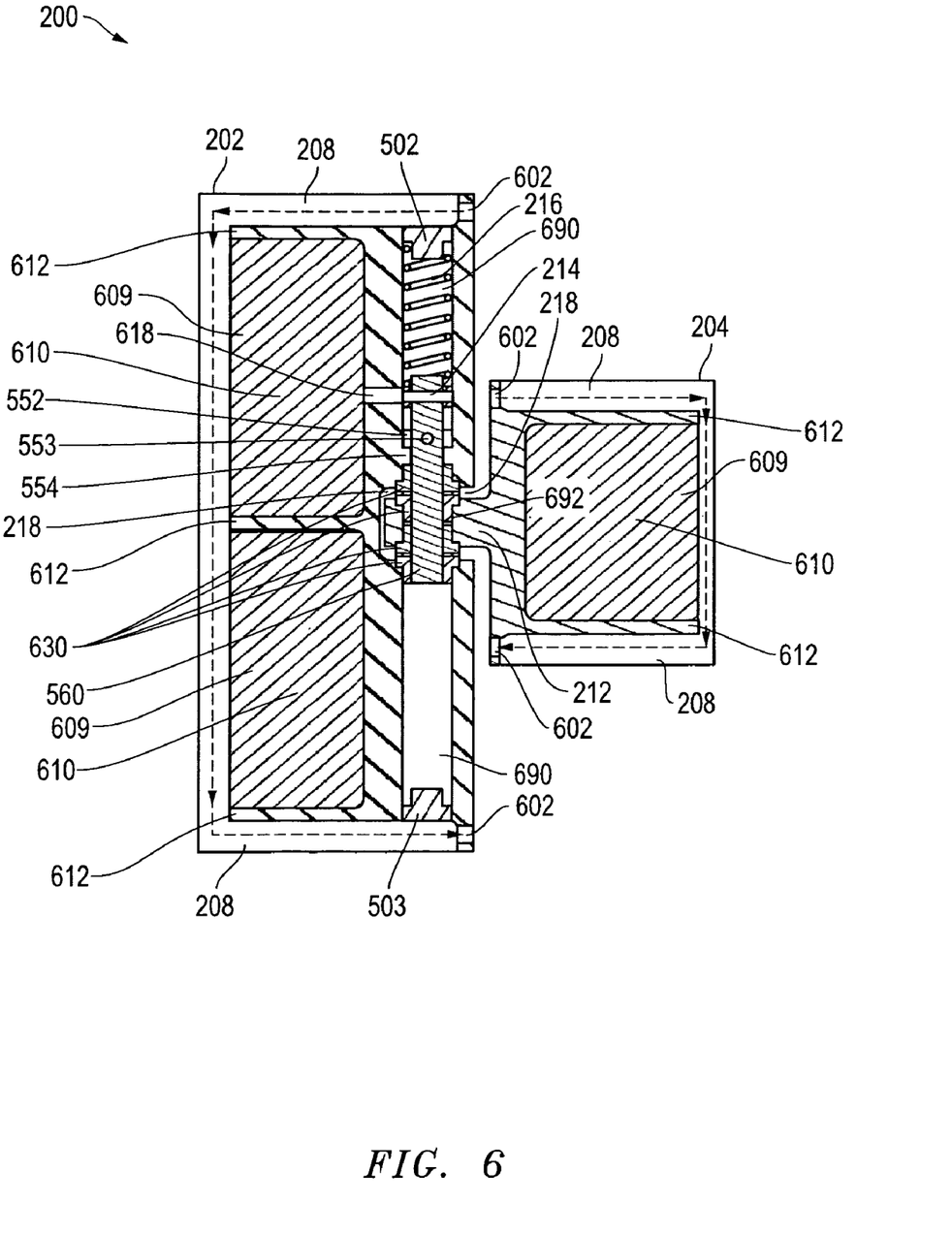
FIG. 6 is a cut-away side view of a hinge assembly according to one exemplary embodiment of the disclosed apparatus and methods.
Figure 7:
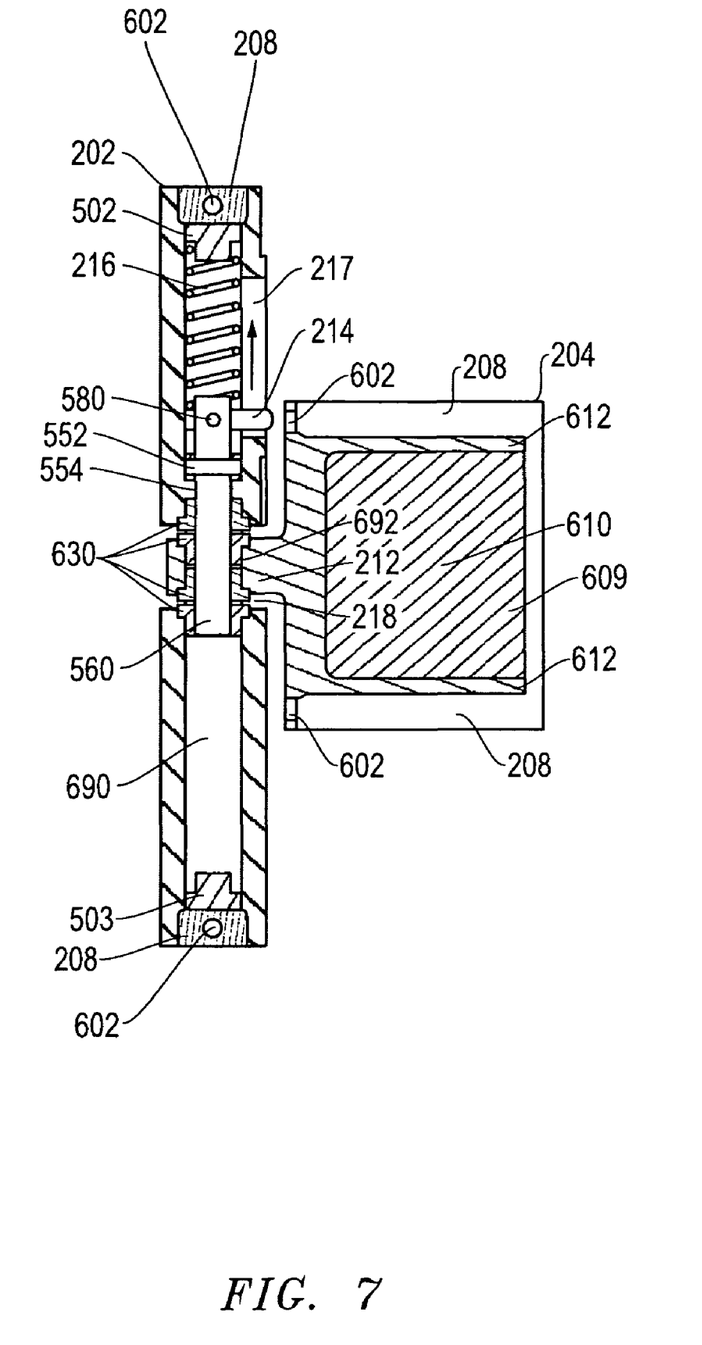
FIG. 7 is a cut-away end and side view of a hinge assembly according to one exemplary embodiment of the disclosed apparatus and methods.
Figure 8:
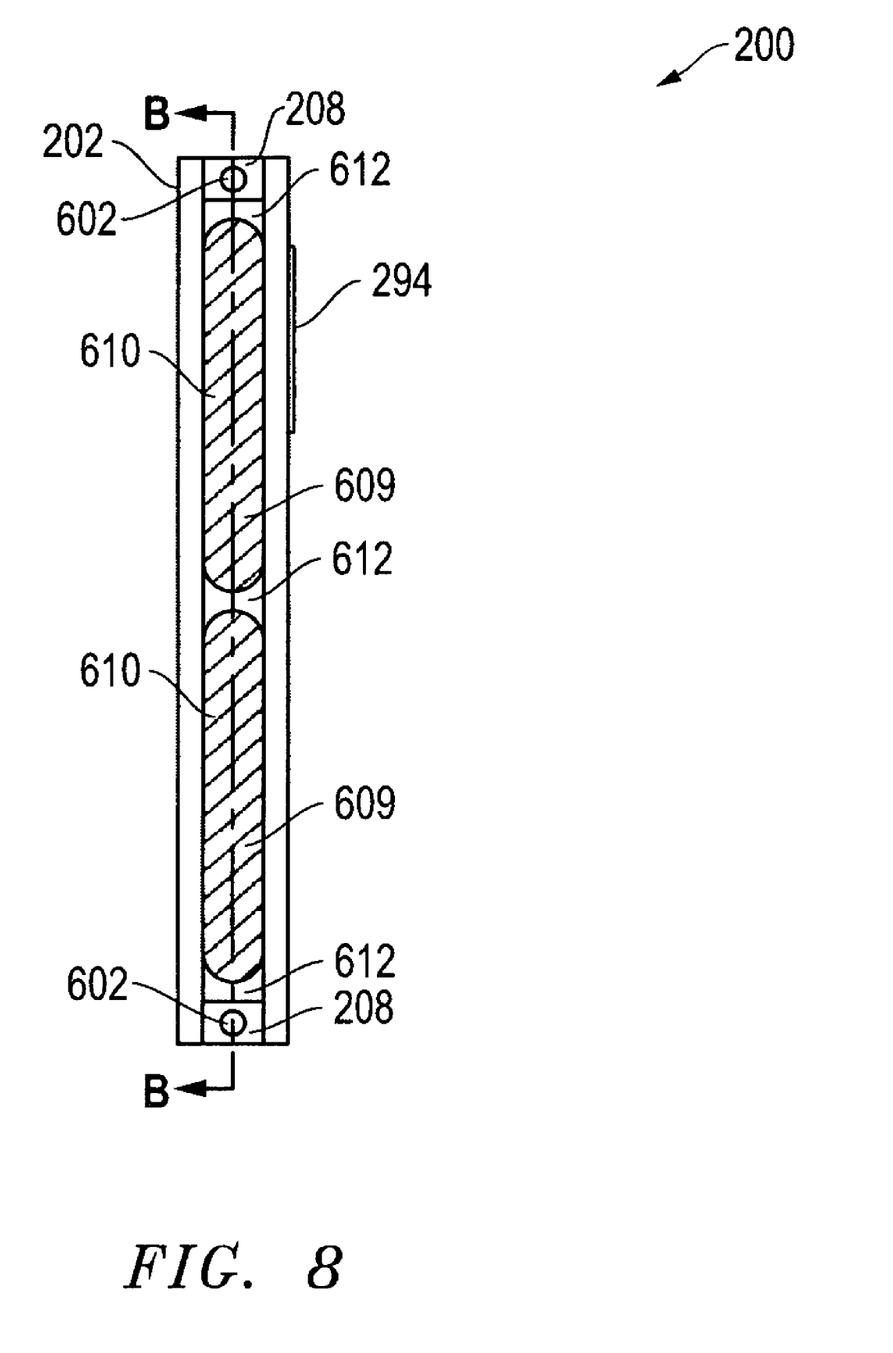
FIG. 8 is end view of a hinge assembly according to one exemplary embodiment of the disclosed apparatus and methods.
Figure 9:
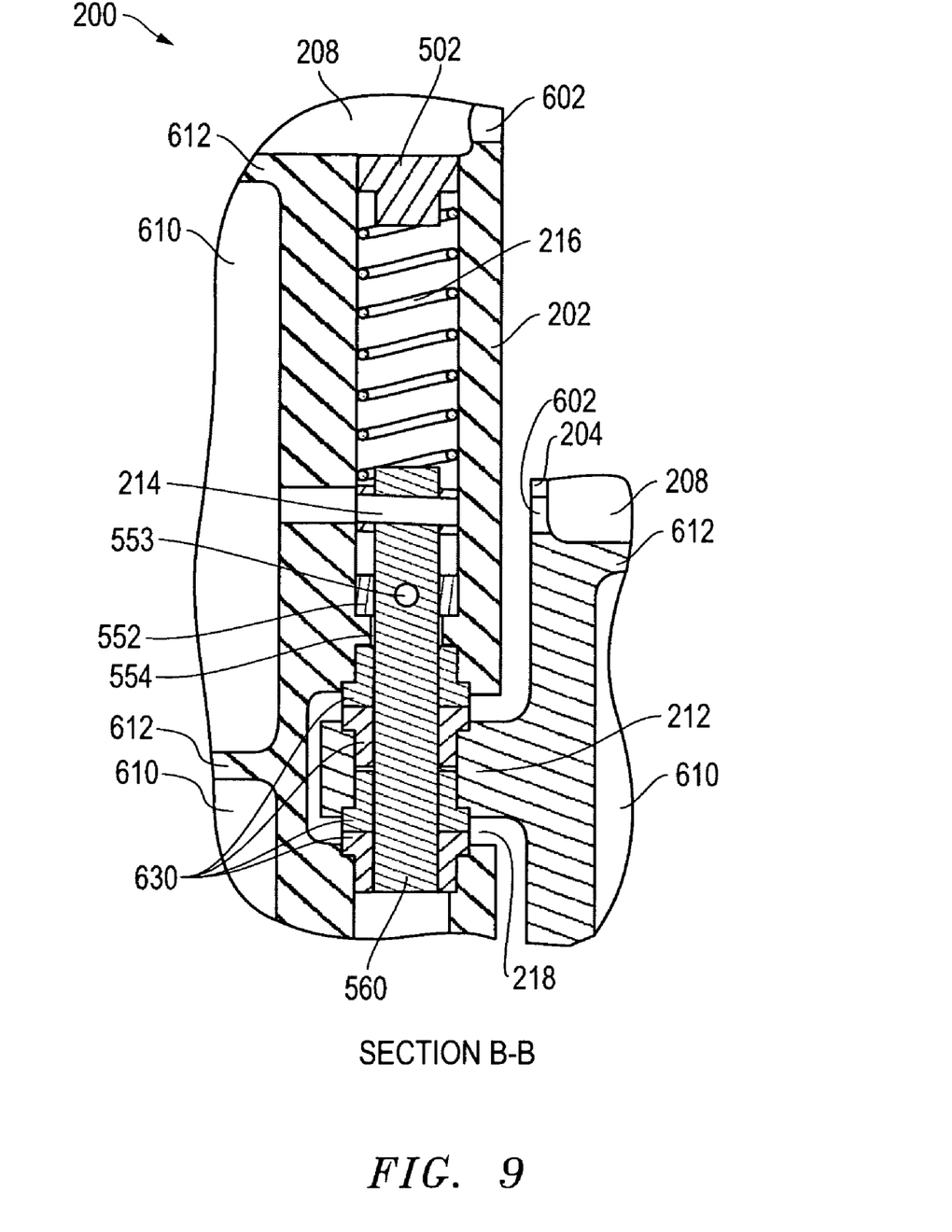
FIG. 9 is partial cut-away side view of section B-B of the hinge assembly of FIG. 8.

Each of first and second hinge components 202 and 204 is shown provided with bonding material injection ports 602 that each extend from a respective face surface of said first or second hinge component 202 and 204 to communicate with bonding material flow channels 208 as shown in cross section in FIGS. 6 and 7. It will be understood that the illustrated number and location of injection ports 602 and bonding material flow channels is exemplary only, and that any fewer or additional number of injection ports and corresponding bonding material flow channels may be provided in any location/s suitable for allowing placement by injection of an uncured flowable bonding material between a hinge pin component and internal surfaces of a substrate cavity in a manner that causes the hinge pin component to be securably retained within the substrate cavity after the bonding material cures. Each of first and second hinge components 202 and 204 may be further provided with optional adherence features defined on one or more external surfaces of the hinge components 202 and 204 in order to facilitate adherence of bonding material to components 202 and 204 within a respective substrate cavity 223 or 224. For example, in the illustrated embodiment, longitudinal grooves 210 are shown provided on side external surfaces of hinge components 202 and 204 that are oriented along the shear plane (e.g., in this case oriented to extend longitudinally parallel to the longitudinal axis of hinge pin openings 690 and 692). When present, adherence features may be provided in other configurations and orientations (e.g., raised bumps, intermittent grooves, etc.) on one or more external surfaces of a respective hinge component.

Although each of the hinge components 202 and 204 of the illustrated hinge assembly embodiment 200 are configured to be securably retained within respective substrate cavities 223 and 224 by a flowable bonding material, it will be understood that other embodiments of the disclosed hinge assembly may be configured to be securably retained within respective substrate cavities by any other suitable method, e.g., using fasteners (e.g., screws or bolts inserted through both substrate and hinge assembly), non-flowable or pre-deposited bonding materials (e.g., bonding material that is pre-deposited within a substrate cavity and into which a hinge assembly is then inserted), etc.

Figure 5:
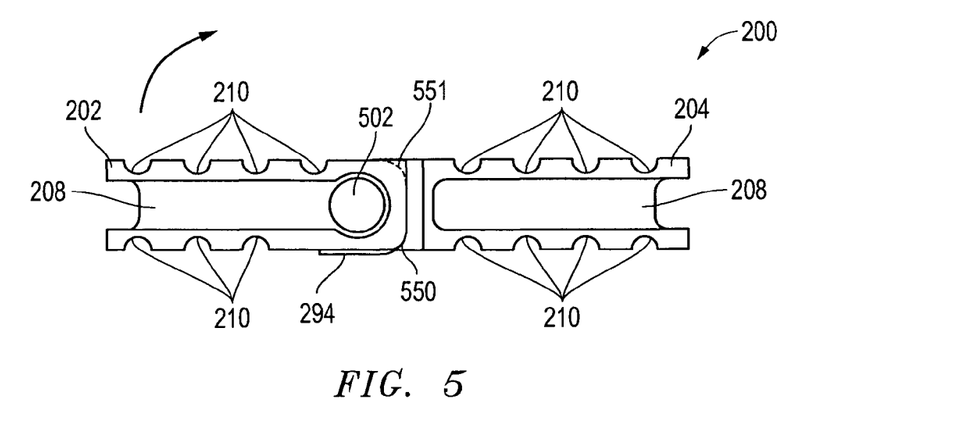
FIG. 5 is an overhead view of a hinge assembly according to one exemplary embodiment of the disclosed apparatus and methods.

As further illustrated in the figures, second hinge component 204 is provided with a flange 212 that projects from face surface 262 of second hinge component 204 and that is configured to be received within a corresponding recess 218 defined in face surface 260 of first hinge component 202. An elongated internal cylindrical hinge pin opening 692 is defined within flange 212 of second hinge component 204 that is configured to receive an elongated cylindrical hinge pin 560 of first hinge component 202. When so received in flange 212, flange 212 is allowed to rotate about hinge pin 560 in order to rotatably or hingeably couple together first and second hinge components 202 and 204. As illustrated in FIG. 2, windows 291 are defined within face surface of first substrate 220 (e.g., trimmed out from a door panel face sheet) in order to provide clearance for flange 212 to rotate when first and second hinge components 202 and 204 are respectively received within substrate cavities 223 and 224 in order to hingeably couple first substrate 220 to second substrate 222. Furthermore, as shown in FIG. 5, one corner edge 550 of first hinge component 202 (e.g., corner edge common to the external face of a door panel) may be rounded to provide a radius (e.g., a radius of about 0.16 inch in one embodiment) for clearance to allow rotation of first hinge component 202 in the direction of the arrow by about 110 degrees relative to second hinge component 204. In another embodiment, a second (outboard) corner edge 551 may also be rounded to provide a similar radius as shown in dashed outline in FIG. 5 (e.g., to allow the door panel to further rotate about 180 degrees from the closed position in the direction of the arrow).

As illustrated in FIGS. 6 and 7, first hinge component 202 is provided with two optional internal hinge component cavities 610 and second hinge component 204 is provided with one optional internal cavity. Each internal hinge component cavity 610 is defined by internal walls 612 of its respective hinge component and may be optionally substantially filled prior to hinge installation (e.g., during manufacture or thereafter) with a relatively lightweight filler material 609 that is lighter or less dense than the material from which first and second hinge components 202 and 204 are constructed, and that may be selected to strengthen and lighten the corresponding hinge component. For example, in one exemplary embodiment first and second hinge components 202 and 204 may be constructed of aluminum or aluminum alloy material, and internal hinge component cavities 610 substantially filled with a filler (e.g., edge fill) material such as ATR 1000 available from AAR Composites of Wood Dale, Illinois, EPOC-AST EC 3524 B/A two part adhesive available from Huntsman Advanced Materials of Basel, Switzerland, etc.

In one exemplary embodiment, each of flow channels 208 may be recessed about ⅛ inch from the edge of first and second hinge components 202 and 204, and internal hinge component cavities 610 substantially filled to within about ⅛ inch of the edge of first and second hinge components. In this manner a flow path of about ⅛ inch is formed around the backside periphery of each of first and second hinge components 202 and 204 for a flowable bonding material that is introduced into one of injection ports 602 so that it flows around the outer backside periphery of each of first and second hinge components 202 and 204 to exit out the other injection port 602. It will be understood that flow paths of dimensions of greater than or less than about ⅛ inch may be alternatively employed. Further, it will be understood any number and configuration of injection ports may be provided that is suitable for allowing the introduction of uncured flowable bonding material between a hinge pin component and internal surfaces of a substrate cavity in a manner that causes the hinge pin component to be securably retained within the substrate cavity after the bonding material cures, e.g., only one injection port 602, more than two injection ports, etc.

As shown by the arrows in FIG. 6, a bonding material flow path is provided by channels 208 from each bonding material injection port 602 to allow a flowable bonding material to be introduced to substantially fill spaces between each hinge component (202 and 204) and its respective substrate cavity (223 or 224), after which the flowable bonding material may be allowed to cure per manufacturer's recommended work life and cure time. It will be understood that number and configuration of hinge component cavities provided in a given hinge component may vary, and that in some embodiments no hinge component cavities may be present. Further shown in FIGS. 6 and 7 is an elongated and cylindrical internal hinge pin opening 690 that is defined within first hinge component 202 for receiving hinge pin 560 and related components thereof.

Hinge pin 560 may be constructed of any cylindrical material that is suitably rigid for supporting first and second hinge components 202 and 204 in hinged relationship and to meet the load conditions (e.g., cabinet door weight, etc.) for a given application. Examples include, but are not limited to, steel, fiberglass, etc. In one exemplary embodiment, hinge pin 560 may be constructed of 17-4PH or 17-7PH (precipitation hardened) stainless steel wire rope.

Recess 218 is defined within first hinge component 202 at a position to intersect hinge pin opening 690 as shown to provide clearance for insertion of flange 212 as shown. Optional bushings 630 (e.g., polymer bushings such as nylon-constructed bushings that may be selected to preclude use of lubricants) are positioned (e.g., press-fitted or otherwise frictionally retained, or retained in any other suitable manner) as shown within opening 690 of first hinge component 202 and opening 692 of flange 212 for internally receiving hinge pin 630 in longitudinally aligned relationship as shown. In this configuration, first hinge component 202 and second hinge component 204 are free to rotate relative to each other about hinge pin 560. When present, optional bushings 630 may be composed of a material that acts to reduce friction between hinge pin 630 and internal hinge pin openings 690 and/or 692.

Hinge pin 560 is provided with a lower hinge pin collar 552 that serves to center hinge pin 560 within the upper half of internal hinge pin opening 690. Hinge pin opening 690 is provided with a narrowed internal profile 554 that functions as a stop surface to prevent lower hinge pin collar 552 of hinge pin 560 from being displaced further downward, thus maintaining hinge pin 560 in an inserted aligned relationship relative to hinge pin opening 692 Lower hinge pin collar 552 is retained on hinge pin 560 by roller pin 553.

In the illustrated embodiment, hinge pin 560 is biased downward by a hinge pin return member (e.g., a hinge pin return spring 216 in this embodiment) so that lower hinge pin collar 552 is held in position against the stop surface of narrowed internal profile 554 and so that hinge pin 560 is held in a position inserted through internal hinge pin openings 690 and 692. As shown, hinge pin return spring 216 is retained within hinge pin opening 690 between the upper end of hinge pin 560 and upper plug 502. Upper plug 502 may be of any suitable material (e.g., a selective laser sintering (SLS) part made of nylon or fabricated from aluminum, plastic, brass, ceramic, etc.) and may be retained in the upper end of hinge pin opening 690 by epoxy resin, or other suitable method (e.g., mechanically threads, etc.). Also illustrated is a lower plug 503 that may be of similar construction and retention as upper plug 502. It will be understood that each of plugs 502 and 503 are optional, and that any other suitable configuration may be employed for retaining the upper end of hinge pin return spring 216 within hinge pin opening 690, e.g., cross pin, spring pin, etc. Further any other suitable configuration of hinge pin return member may be employed that is suitable for biasing hinge pin 560 into a position inserted through internal hinge pin openings 690 and 692, e.g., such as an elongated compressible elastic member, etc. In one exemplary embodiment, plugs 502 and 503 also act to prevent intrusion of bonding material into hinge pin opening 690 during injection of uncured flowable bonding material into injection ports 602.

Figure 10:
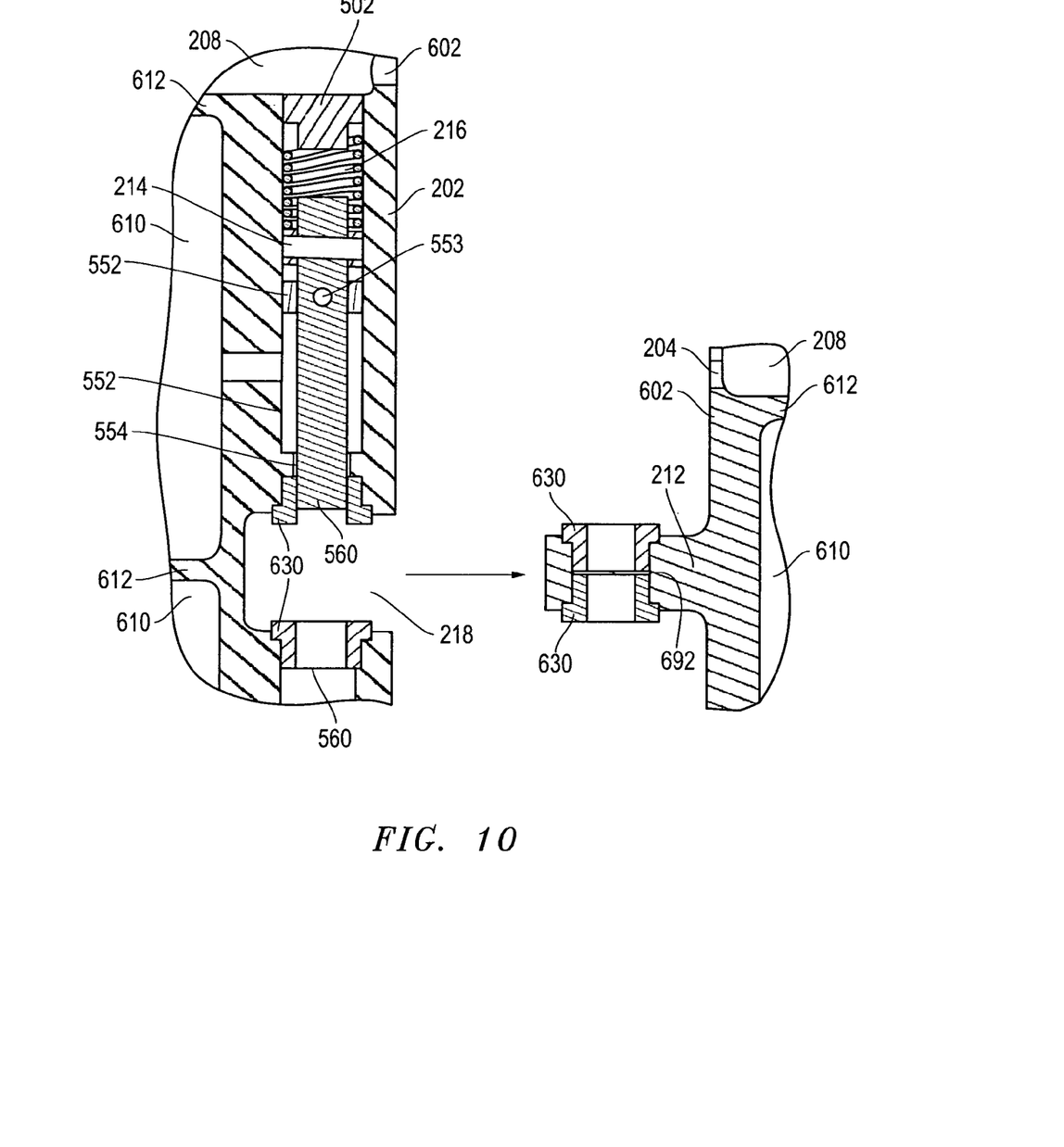
FIG. 10 is partial cut-away side view of section B-B of the hinge assembly of FIG. 8.

As further shown, a longitudinal hinge pin access opening 217 is defined to extend through the body of first hinge pin component 202 from internal hinge pin opening 690 to external side surface 294 of first hinge pin component 202 to allow a manipulation tab (e.g., tab collar 214 in this exemplary embodiment) to protrude through hinge pin access opening 217 as shown in FIG. 7. As further shown in FIGS. 6 and 7, an access port 618 may be provided in first hinge component 202 to allow insertion of a roller pin 580 through access port 618 into a position within hinge pin 560 that secures pin tab collar 214 to hinge pin 560. A corresponding window 293 may be defined within face surface of first substrate 220 (e.g., trimmed out from a door panel face sheet) as shown in FIG. 2 in order to provide access to longitudinal hinge pin access opening 217 when first hinge component is received within cavity 223. As so configured, longitudinal hinge pin access opening 217 provides external access (i.e., from outside first hinge pin component 202) for manipulation of hinge pin tab collar 214 (e.g., by fingers of a human user) in the direction of the arrow shown in FIG. 7 by an upward force greater than the downward bias force of hinge pin return spring 216. Upward displacement of hinge pin tab collar 214 in this manner causes hinge pin return spring 216 to be compressed between the upper end of hinge pin 560 and upper plug 502, and at the same time causes hinge pin 560 to be axially displaced upward (i.e., displaced upward in a direction parallel to its longitudinal axis) within internal hinge pin opening 690 to a retracted position where it is no longer inserted through internal hinge pin opening 692 of second hinge pin component 204, as shown in FIG. 10. As illustrated for this exemplary embodiment, external surface 294 of first hinge pin component 202 may be optionally configured as a raised surface for purposes of providing additional material for defining the hinge pin access opening 217, although this is not necessary.

When hinge pin 560 is retracted and removed from internal hinge pin opening 692, then flange 212 of second hinge pin component 204 may be removed from recess 218 of first hinge component 202, thus allowing complete separation of components 202 and 204 (along with complete separation of any two substrates to which they may be attached), as shown in FIG. 10. When the upward force is no longer exerted on hinge pin tab collar 214, compressed hinge pin return spring 216 biases hinge pin 560 back downward within internal hinge pin opening 690. To reconnect second hinge component 204 to first hinge component 202, flange 212 of second hinge pin component 204 may be reinserted into recess 218 of first hinge component 202 while hinge pin 560 is in the retracted position, followed by allowing hinge pin 560 to fall back to inserted position within internal hinge pin opening 692 of second hinge component 204. By so manipulating hinge pin 560 between inserted and retracted positions, first hinge component 202 may be disconnected and reconnected to second hinge component 204 as desired. It will be understood that the illustrated configuration of hinge pin access opening 217 is exemplary only, and that any other type of opening and/or mechanism may be provided that is suitable for allowing external manipulation of hinge 560 between inserted and retracted positions from outside first hinge component 202.

It will be understood that the disclosed configuration of hinge pin 560 (e.g., with hinge pin tab collar 214 and lower hinge pin collar 552) is exemplary only, and that any other configuration of hinge pin may be employed that is suitable for hingeably interconnecting a first hinge component with a second hinge component that may be lowered and raised so as to selectably interconnect a first hinge component to a second hinge component in the manner described herein. Further, it will be understood that hinge pin return spring 216 is optional and may not be present in other embodiments, e.g., a hinge pin may be slidably moved within an internal hinge pin opening of a first hinge component and between inserted and retracted positions within an internal hinge pin opening of a second hinge pin component without the presence of hinge pin return spring 216 and instead relying on a mechanical or frictional stop to retain the hinge pin in one of the retracted and/or inserted positions.

Figure 4:
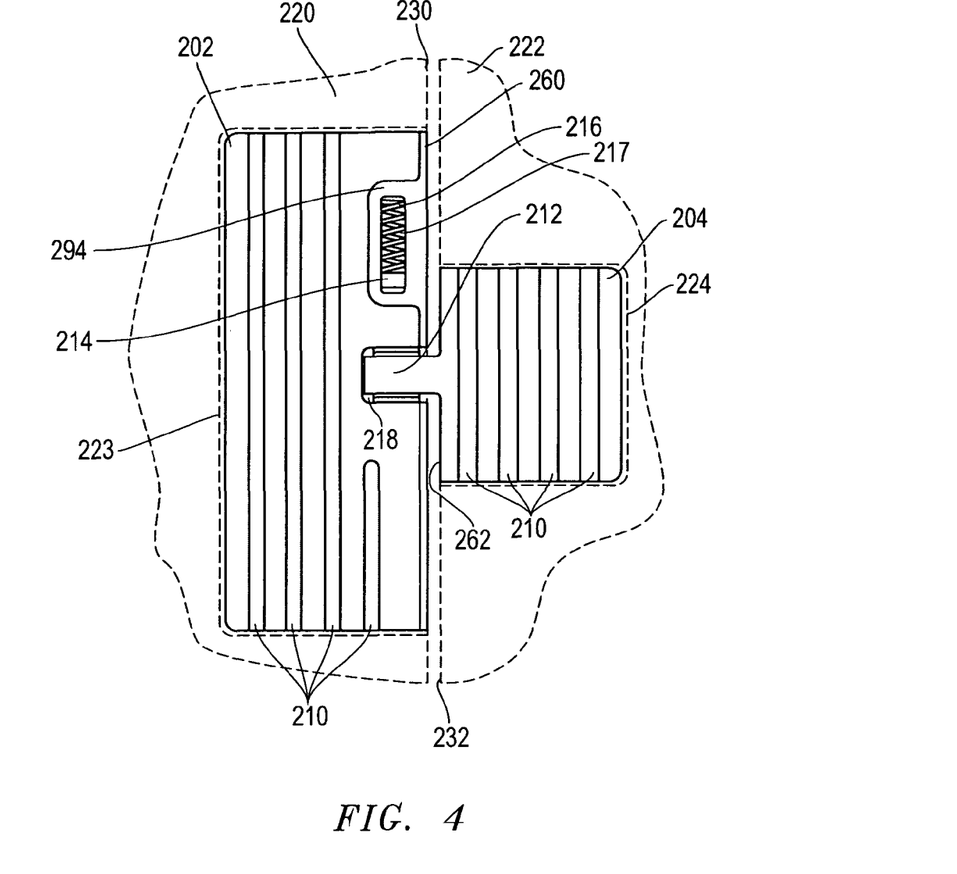
FIG. 4 is a cut-away side view of two substrates and a hinge assembly according to one exemplary embodiment of the disclosed apparatus and methods.

In one embodiment, the disclosed hinge assembly 200 of FIG. 2 may be installed to hingeably couple together two substrates 220 and 222 in a manner as follows. For purposes of this exemplary description, first substrate 220 is assumed to be a cabinet door panel, and second substrate 222 is assumed to be a cabinet wall panel to which the cabinet door is to be hingeably coupled. First, a location for the hinge installation is respectively chosen on each of first substrate 220 and second substrate 222. Then core material is routed from both the first substrate 220 (e.g., door panel) and the second substrate 222 (e.g., wall panel) to provide respective cavity spaces 223 and 224 for insertion of first and second hinge components 202 and 204, respectively. In this regard, only the minimum amount of core material may be removed that is required to provide internal dimensional clearance for insertion of each hinge component 202 and 204, or core material may be removed from face sheet-to-face sheet of each substrate 220 and 222. As shown in FIG. 4, depth of cavity 223 may be just deep enough that upon full insertion of first hinge component 202 into cavity 223, the face surface 260 of first hinge component 202 is disposed in flush coplanar relationship with the corresponding adjacent face surface 230 of first substrate 220, and so that face surface of 260 of first hinge component 202 is exposed as shown in FIG. 4. Similarly, depth of cavity 224 may be just deep enough that upon full insertion of second hinge component 204 into cavity 224, the face surface 262 of first hinge component 204 is disposed in flush coplanar relationship with the corresponding adjacent face surface 232 of second substrate 222, and so that face surface 262 of second hinge component 204 is exposed as shown in FIG. 4.

Next, hinge component 202 is inserted into cavity 223 and hinge component 204 is separately inserted into cavity 224, i.e., hinge component 202 and hinge component 204 are not hingeably coupled together during this insertion step, but are instead completely separated from each other. Hinge component 202 may be temporarily affixed to first substrate 220 and hinge component 204 may be temporarily affixed to second substrate 222 during this step, e.g., using rigid tape or clamps. Sufficient bonding material is then pressure injected through a first injection port 602 of each of first and second hinge components 202 and 204 so that the flowable bonding material displaces air and is forced to flow in a one-way direction all around the peripheries of first and second hinge components 202 and 204 (including through grooves 210) within cavities 223 and 224 and out a second open injection port 602 as shown by the arrows in FIG. 6. When so injected, flowable bonding material flows from the first injection port to the second injection port of each hinge component so that the flowable bonding material substantially fills the space between the peripheral surfaces of each of first and second hinge components 202 and 204 and the interior surfaces of the respective substrate cavity 223 or 224 into which it is inserted so that flowable bonding material substantially fills respective cavities 223 and 224 of first and second substrates 220 and 222, including grooves 210 of first and second hinge components 202 and 204. Sufficient injection pressure may be applied so as to eliminate any trapped air pockets or voids present in the spaces between hinge components 202, 204 and respective cavities 223, 224 and to ensure that bonding material flows in to fill cavities 610 and grooves 210 along the sides of hinge components 202 and 204, e.g., by employing a pneumatic sealing gun to inject bonding material under pressure into injection ports 602 through a pneumatic sealing tube. Excess bonding material is then wiped away and the bonding material is then allowed to cure, e.g., per manufacturer's specification. Following bonding material cure, rounded edges 298 may be formed face surface 230 of first substrate 220 by using rounded edges of face surface 260 of first hinge component 202 as a guide, e.g., by extending radius of rounded edges of face surface 260 of first hinge component 202 to the edge of face surface 260 of first substrate 220.

To complete installation of the hinge assembly 200, the hinge pin tab collar 214 is raised to compress hinge pin return spring 216 and lift hinge pin 560 to a retracted position so that it is removed from recess 218 of first hinge component 202. Second substrate 222 is then positioned adjacent and aligned with first substrate 220 so that flange 212 of second hinge pin component 204 is inserted into recess 218 of first hinge component 202 and so that opening 692 of second hinge component 204 is centered and longitudinally aligned with opening 690 of first hinge component 202. The upward force is then release from hinge pin tab collar 214, allowing compressed hinge pin return spring 216 to bias hinge pin 560 downward into internal hinge pin openings 690 and 692 (as shown, for example, in FIG. 9) to hingeably couple first substrate 220 to second substrate 222. Because the face surfaces 260 and 262 of each of hinge components 202 and 204 are disposed in flush coplanar relationship with the corresponding adjacent substrate face surfaces 230 and 232, substrates 220 and 222 are now hingeably coupled together in a manner so that hinge components 202 and 204 are substantially concealed when first and second substrates 220 and 222 are rotated about hinge assembly 200 into end-to-end orientation with each other (e.g., such as when first substrate 220 is a cabinet door that is rotated into closed position to a second substrate 222 that is a cabinet panel wall).

Although substantially planar substrates are illustrated herein, it will be understood that the disclosed hinge assemblies may also be employed to hingeably couple together non-planar substrates, or to hingeably couple together a substantially planar substrate to a non-planar substrate. Further, although the disclosed apparatus and methods have been described herein in relation to an embodiment in which a cabinet panel door is hingeably coupled to a cabinet panel door with the cabinet panel door being oriented relative to the cabinet panel wall at about 90 degrees when closed, it will be understood that the disclosed apparatus and methods may be employed to hingeably coupled together cabinet panel components in other relative orientations, e.g., cabinet panel door being oriented relative to the cabinet panel wall at about 0 degrees when closed, cabinet panel door being oriented relative to the cabinet panel wall at orientations anywhere between 0 and 180 degrees when closed, etc.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed apparatus and methods may be utilized in various combinations and/or independently. Thus the invention is not limited to only those combinations shown herein, but rather may include other combinations.

What is claimed is:

1. An assembly of two substrates, comprising:

a first hinge component and a first substrate, said first hinge component having a first internal hinge pin opening defined therein, and said first hinge component being secureably retained by cured bonding material within an internal cavity of said first substrate with at least one face surface of said first hinge component being exposed;

a second hinge component and a second substrate, said second hinge component having a second internal hinge pin opening defined therein, and said second hinge component being secureably retained by cured bonding material within an internal cavity of said second substrate with at least one face surface of said second hinge component being exposed; and an elongated hinge pin simultaneously received in at least a portion of said first internal hinge pin opening of said first hinge component and in at least a portion of said second internal hinge pin opening of said second hinge component to hingeably couple together said first hinge component and said second hinge component;

wherein said first hinge component comprises at least one bonding material injection port defined in said at least one face surface of said first hinge component, said at least one bonding material injection port providing a communication path through at least one flow channel to allow placement by injection of said bonding material in uncured form between said first hinge pin component and said internal cavity of said first substrate; and wherein said second hinge component comprises at least one bonding material injection port defined in said at least one face surface of said second hinge component, said at least one bonding material injection port providing a communication path through at least one flow channel to allow placement by injection of said bonding material in uncured form between said second hinge pin component and said internal cavity of said second substrate.

2. The assembly of claim 1, where said first hinge component comprises opposing side external surfaces that are separated by a backside peripheral edge with the at least one face surface of said first hinge component extending between the opposing side external surfaces of the first hinge component, the opposing side external surfaces and backside peripheral edge of the first hinge component being contained within the internal cavity of the first substrate;

where said second hinge component comprises opposing side external surfaces separated by a backside peripheral edge with the at least one face surface of said second hinge component extending between the opposing side external surfaces of the second hinge component, the opposing side external surfaces and backside peripheral edge of the second hinge component being contained within the internal cavity of the second substrate;

where said first hinge component is contained within the internal cavity of the first substrate and where the at least one flow channel is recessed in and contiguous with the backside peripheral edge of said first hinge component to allow placement by injection of the uncured flowable bonding material between said first hinge pin component and the internal cavity of the first substrate; and where said second hinge component is contained within the internal cavity of the second substrate and where the at least one flow channel that is recessed in and contiguous with the backside peripheral edge of said second hinge component to allow placement by injection of the uncured flowable bonding material between said second hinge pin component and the internal cavity of the second substrate.

3. The assembly of claim 2, wherein said first hinge pin component comprises adherence features defined on at least one external surface of said first hinge component; wherein said second hinge pin component comprises adherence features defined on at least one external surface of said second hinge component; wherein cured bonding material is positioned between said adherence features of said first hinge component and said internal cavity of said substrate; and wherein cured bonding material is positioned between said adherence features of said second hinge component and said internal cavity of said substrate.

4. The assembly of claim 2, wherein said elongated hinge pin is axially displaceable between a first position within said first internal hinge pin opening and a second position within said first internal hinge pin opening; and wherein said first internal hinge pin opening of said first hinge component is configured to be aligned with said second internal hinge pin opening of said second hinge component so that when said elongated hinge pin of said first hinge component in its first position extends from said first hinge pin opening into said second hinge pin opening of said second hinge opening to hingeably couple together said first hinge component and said second hinge component and so that said elongated hinge pin of said first hinge component in its second position is retracted from said second hinge pin opening of said second hinge opening so that said first hinge component and said second hinge component are separable and not hingeably coupled together.

5. The assembly of claim 4, wherein first hinge component further comprises a hinge pin return member, said hinge pin return member being configured to bias said hinge pin from said second position into said first position within said first internal hinge pin opening.

6. The assembly of claim 4, wherein said first hinge component further comprises a hinge pin access opening defined to extend through the body of said first hinge pin component from said first internal hinge pin opening to an external surface of said first hinge pin component, said hinge pin access opening providing external access to allow displacement of said hinge pin between said first position within said first internal hinge pin opening and said second position within said first internal hinge pin opening.

7. The assembly of claim 6, wherein said hinge pin further comprises a manipulation tab, said manipulation tab extending into said hinge pin access opening.

8. The assembly of claim 4, wherein said second hinge component further comprises a flange projecting outwardly from said face surface of said second hinge component, said second internal hinge pin opening being defined within said flange; and wherein said face surface of said first hinge component has a recess defined therein that bisects said first internal pin opening; and wherein said flange of said second hinge component is configured to be received in said recess of said first hinge component so that said first internal hinge pin opening of said first hinge component is aligned with said second internal hinge pin opening of said second hinge component.

9. The assembly of claim 2, where the backside peripheral edge of the first hinge component extends around the backside periphery of the first hinge component; and where the backside peripheral edge of the second hinge component extends around the backside periphery of the second hinge component.

10. The assembly of claim 2, where the at least one flow channel of the first hinge component is configured to form a flow path around the backside periphery of the first hinge component for uncured flowable bonding material that is injected through the at least one bonding material injection port of the first hinge component such that the uncured flowable bonding material flows around the outer backside periphery of the first hinge component contained within the internal cavity of the first substrate; and where the at least one flow channel of the second hinge component is configured to form a flow path around the backside periphery of the second hinge component for uncured flowable bonding material that is injected through the at least one bonding material injection port of the second hinge component such that the uncured flowable bonding material flows around the outer backside periphery of a second hinge component contained within the internal cavity of the second substrate.

11. The assembly of claim 2, where the at least one bonding material injection port of said first hinge component comprises at least first and second bonding material injection ports defined in said at least one face surface of said first hinge component, the first and second bonding material injection ports of said first hinge component being configured to form a flow path therebetween that is around the backside periphery of the first hinge component for uncured flowable bonding material that is injected through the first bonding material injection port of the first hinge component such that the uncured flowable bonding material flows around the outer backside periphery of the first hinge component in one direction from the first to the second bonding material injection port of the first hinge component contained within the internal cavity of the first substrate; and where the at least one bonding material injection port of said second hinge component comprises at least first and second bonding material injection ports defined in said at least one face surface of said second hinge component, the first and second bonding material injection ports of said second hinge component configured to form a flow path therebetween that is around the backside periphery of the second hinge component for uncured flowable bonding material that is injected through the first bonding material injection port of the second hinge component such that the uncured flowable bonding material flows around the outer backside periphery of the second hinge component in one direction from the first to the second bonding material injection port of the second hinge component contained within the internal cavity of the second substrate.

12. The assembly of claim 2, where the at least one bonding material injection port of the first hinge component comprises at least first and second bonding material injection ports defined in said at least one face surface of said first hinge component, the first and second bonding material injection ports of the first hinge component configured to form a one direction flow path therebetween that is for uncured flowable bonding material that is injected through the first bonding material injection port of the first hinge component contained within the internal cavity of the first substrate such that the uncured flowable bonding material flows all around the periphery of the first hinge component within the cavity of the first substrate from the first bonding material injection port of the first hinge component to and out of the second bonding material injection port of the first hinge component; and where the at least one bonding material injection port of the second hinge component comprises at least first and second bonding material injection ports defined in said at least one face surface of said second hinge component, the first and second bonding material injection ports of the second hinge component configured to form a one direction flow path therebetween that is for uncured flowable bonding material that is injected through the first bonding material injection port of the second hinge component contained within the internal cavity of the second substrate such that the uncured flowable bonding material flows all around the periphery of the second hinge component within the cavity of the second substrate from the first bonding material injection port of the second hinge component to and out of the second bonding material injection port of the second hinge component.

13. The assembly of claim 1, wherein said first hinge component is constructed of a first material and wherein one or more internal cavities are defined in said first material of said first hinge component, said one or more internal cavities of said first hinge component containing a filler material that is less dense than said first material of said first hinge component and wherein said second hinge component is constructed of a first material and wherein one or more internal cavities are defined in said first material of said first hinge component, said one or more internal cavities of said first hinge component containing a filler material that is less dense than said first material of said second hinge component.

14. The assembly of claim 1, wherein said first hinge pin component comprises adherence features defined on at least one external surface of said first hinge component;
wherein said second hinge pin component comprises adherence features defined on at least one external surface of said second hinge component; wherein cured bonding material is positioned between said adherence features of said first hinge component and said internal cavity of said substrate; and wherein cured bonding material is positioned between said adherence features of said second hinge component and said internal cavity of said substrate.

15. The assembly of claim 14, where the adherence features defined on at least one external surface of said first hinge component comprise longitudinal grooves defined in the opposing side external surfaces of the first hinge component; and where the adherence features defined on at least one external surface of said second hinge component comprise longitudinal grooves defined in the opposing side external surfaces of the second hinge component.

16. The assembly of claim 1, wherein said first substrate comprises a substantially planar substrate having a first face surface on an edge thereof; wherein said second substrate comprises a substantially planar substrate having a second face surface on an edge thereof; wherein said at least one face surface of said first hinge component is disposed in flush coplanar relationship with said face surface of said first substrate; and wherein said at least one face surface of said second hinge component is disposed in flush coplanar relationship with said face surface of said second substrate.

17. The assembly of claim 1, wherein said first substrate comprises a cabinet door panel, and wherein said second substrate comprises a cabinet wall panel.

18. The assembly of claim 1, wherein said elongated hinge pin is axially displaceable between a first position within said first internal hinge pin opening and a second position within said first internal hinge pin opening; and wherein said first internal hinge pin opening of said first hinge component is configured to be aligned with said second internal hinge pin opening of said second hinge component so that when said elongated hinge pin of said first hinge component in its first position extends from said first hinge pin opening into said second hinge pin opening of said second hinge opening to hingeably couple said first hinge component with said first substrate to said second hinge component with said second substrate, and so that said elongated hinge pin of said first hinge component in its second position is retracted from said second hinge pin opening of said second hinge opening so that said first hinge component with said first substrate is separable from said second hinge component with said second substrate so that said first and second substrates are not hingeably coupled together.

19. The assembly of claim 18, wherein first hinge component further comprises a hinge pin return member, said hinge pin return member being configured to bias said hinge pin from said second position into said first position within said first internal hinge pin opening.

20. The assembly of claim 19, wherein said first hinge component further comprises a hinge pin access opening defined to extend through the body of said first hinge pin component from said first internal hinge pin opening to an external surface of said first hinge pin component, said hinge pin access opening providing external access to allow displacement of said hinge pin between said first position within said first internal hinge pin opening and said second position within said first internal hinge pin opening.

21. The assembly of claim 20, wherein said hinge pin further comprises a manipulation tab, said manipulation tab extending into said hinge pin access opening.

22. The assembly of claim 18, wherein said second hinge component further comprises a flange projecting outwardly from said face surface of said second hinge component, said second internal hinge pin opening being defined within said flange; and wherein said face surface of said first hinge component has a recess defined therein that bisects said first internal pin opening; and wherein said flange of said second hinge component is configured to be received in said recess of said first hinge component so that said first internal hinge pin opening of said first hinge component is aligned with said second internal hinge pin opening of said second hinge component.

23. The assembly of claim 22, further comprising first and second opposing windows formed in said first substrate to provide clearance for said flange of said second hinge component to rotate about said hinge pin when said flange of said second hinge component is positioned within said recess of said first hinge component and said elongated hinge pin is positioned in said first position to hingeably couple together said first substrate with said secureably retained first hinge component to said second substrate with said securably retained second hinge component; and a third window formed in said first substrate to provide access for manipulation of said hinge pin between said first and second positions.

24. The assembly of claim 1, where the elongated hinge pin is configured to hingeably couple together said first hinge component and said second hinge component together to allow one of the first and second hinge components to pivot about a center plane of the other of the first and second hinge components.

25. The assembly of claim 1, where the first hinge component is secureably retained by the cured bonding material within the internal cavity of the first substrate without requiring any fasteners or requiring separate insert components to be positioned therebetween; and where the second hinge component is secureably retained by the cured bonding material within the internal cavity of the second substrate without requiring any fasteners or requiring separate insert components to be positioned therebetween.

26. A method of hingeably coupling two substrates together, said method comprising:
providing a first hinge component having a first internal hinge pin opening defined therein;
providing a second hinge component having a second internal hinge pin opening defined therein;
providing an elongated hinge pin configured to be simultaneously received in at least a portion of said first internal hinge pin opening of said first hinge component and in at least a portion of said second internal hinge pin opening of said second hinge component to hingeably couple together said first hinge component and said second hinge component;
positioning said first hinge component within an internal cavity of a first substrate with at least one face surface of said first hinge component being exposed and injecting an uncured bonding material into at least one bonding material injection port defined in said at least one face surface of said first hinge component while said first hinge component is so positioned within said internal cavity of a first substrate, and displacing said at least one bonding material from said injection port through at least one flow channel in said first hinge component to place said uncured bonding material between said first hinge pin component and said internal cavity of said first substrate;
allowing said uncured bonding material to cure in a position between said first hinge pin component and said internal cavity of said first substrate so that said first hinge component is secureably retained within said internal cavity of said first substrate by said cured bonding material;
positioning said second hinge component within an internal cavity of a second substrate with at least one face surface of said second hinge component being exposed and injecting an uncured bonding material into at least one bonding material injection port defined in said at least one face surface of said second hinge component while said second hinge component is so positioned within said internal cavity of a second substrate, and displacing said at least one bonding material from said injection port through at least one flow channel in said second hinge component to place said uncured bonding material between said second hinge pin component and said internal cavity of said second substrate;
allowing said uncured bonding material to cure in a position between said second hinge pin component and said internal cavity of said second substrate so that said second hinge component is secureably retained within said internal cavity of said second substrate by said cured bonding material so that said first substrate is hingeably coupled together with said second hinge component.

27. The method of claim 26, wherein said first hinge pin component comprises adherence features defined on at least one external surface of said first hinge component; wherein said second hinge pin component comprises adherence features defined on at least one external surface of said second hinge component; wherein said method further comprises injecting said uncured bonding material into said at least one bonding material injection port defined in said at least one face surface of said first hinge component while said first hinge component is so positioned within said internal cavity of a first substrate, and displacing said at least one bonding material from said injection port through at least one flow channel in said first hinge component to place said uncured bonding material between said adherence features of said first hinge component and said internal cavity of said substrate; and wherein said method further comprises injecting said uncured bonding material into said at least one bonding material injection port defined in said at least one face surface of said second hinge component while said second hinge component is so positioned within said internal cavity of a second substrate, and displacing said at least one bonding material from said injection port through at least one flow channel in said second hinge component to place said uncured bonding material between said adherence features of said second hinge pin component and said internal cavity of said second substrate.

28. The method of claim 26, wherein said first substrate comprises a substantially planar substrate having a first face surface on an edge thereof; wherein said second substrate comprises a substantially planar substrate having a second face surface on an edge thereof; and wherein said method further comprises positioning said first hinge component within said internal cavity of said first substrate so that said at least one face surface of said first hinge component is disposed in flush coplanar relationship with said face surface of said first substrate prior to said step of injecting said uncured bonding material into at least one bonding material injection port defined in said at least one face surface of said first hinge component, and positioning said second hinge component within said internal cavity of said second substrate so that said at least one face surface of said second hinge component is disposed in flush coplanar relationship with said face surface of said second substrate prior to said step of injecting said uncured bonding material into at least one bonding material injection port defined in said at least one face surface of said second hinge component.

29. The method of claim 26, wherein said first substrate comprises a cabinet door panel, and wherein said second substrate comprises a cabinet wall panel.

30. The method of claim 26, wherein said first hinge component has a first internal hinge pin opening defined therein, said first hinge component including said elongated hinge pin received in at least a portion of said first internal hinge pin opening of said first hinge component, said elongated hinge pin being axially displaceable between a first position within said first internal hinge pin opening and a second position within said first internal hinge pin opening; and wherein said method further comprises:

positioning said first substrate with said secureably retained first hinge component in adjacent relationship with said second substrate with said securably retained second hinge component so that said first internal hinge pin opening of said first hinge component is aligned with said second internal hinge pin opening of said second hinge component while said elongated hinge pin is positioned in said second position within said internal hinge pin opening, said elongated hinge pin of said first hinge component in its second position being retracted from said second hinge pin opening of said second hinge opening so that said first hinge component and said second hinge component are separable and not hingeably coupled together; and axially displacing said elongated hinge pin from said second position to said first position while said first substrate is positioned with said secureably retained first hinge component in adjacent relationship with said second substrate with said securably retained second hinge component so that said first internal hinge pin opening of said first hinge component is aligned with said second internal hinge pin opening of said second hinge component, said elongated hinge pin of said first hinge component in its first position extending from said first hinge pin opening of said first hinge pin component into said second hinge pin opening of said second hinge opening to hingeably couple together said first substrate with said secureably retained first hinge component to said second substrate with said securably retained second hinge component.

31. The method of claim 30, wherein first hinge component further comprises a hinge pin return member, said hinge pin return member being configured to bias said hinge pin from said second position into said first position within said first internal hinge pin opening; and wherein said method further comprises allowing said hinge pin return member to axially displace said elongated hinge pin from said second position to said first position while said first substrate is positioned with said secureably retained first hinge component in adjacent relationship with said second substrate with said securably retained second hinge component.

32. The method of claim 30, wherein said first hinge component further comprises a hinge pin access opening defined to extend through the body of said first hinge pin component from said first internal hinge pin opening to an external surface of said first hinge pin component, said hinge pin access opening providing external access to allow displacement of said hinge pin between said first position within said first internal hinge pin opening and said second position within said first internal hinge pin opening;

wherein said hinge pin further comprises a manipulation tab, said manipulation tab extending into said hinge pin access opening; and wherein said method further comprises positioning said elongated hinge pin from said first position into said second position within said internal hinge pin opening by applying an external force to said manipulation tab prior to positioning said first substrate with said secureably retained first hinge component in adjacent relationship with said second substrate with said securably retained second hinge component.

33. The method of claim 30, wherein said second hinge component further comprises a flange projecting outwardly from said face surface of said second hinge component, said second internal hinge pin opening being defined within said flange; wherein said first hinge component further comprises a face surface, said face surface of said second hinge component having a recess defined therein that bisects said first internal pin opening; and wherein said method further comprises positioning said flange of said second hinge component within said recess of said first hinge component so that said first internal hinge pin opening of said first hinge component is aligned with said second internal hinge pin opening of said second hinge component.

34. The method of claim 33, further comprising forming first and second windows in said first substrate to provide clearance for said flange of said second hinge component to rotate about said hinge pin when said flange of said second hinge component is positioned within said recess of said first hinge component and said elongated hinge pin is positioned in said first position to hingeably couple together said first substrate with said secureably retained first hinge component to said second substrate with said securably retained second hinge component; and forming a third window in said first substrate to provide access for manipulation of said hinge pin between said first and second positions.

* * * * *